(12) United States Patent
Kyle

(10) Patent No.: US 8,774,170 B2
(45) Date of Patent: Jul. 8, 2014

(54) ROUTING CALLS WITHOUT TOLL FREE CHARGES

(75) Inventor: Andre B. Kyle, Mandeville, LA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 72 days.

(21) Appl. No.: 13/359,522

(22) Filed: Jan. 27, 2012

(65) Prior Publication Data

US 2013/0195102 A1 Aug. 1, 2013

(51) Int. Cl.
*H04L 12/66* (2006.01)
(52) U.S. Cl.
USPC .......................... 370/352; 370/351
(58) Field of Classification Search
USPC .................................. 370/352, 351
See application file for complete search history.

(56) References Cited

U.S. PATENT DOCUMENTS

2007/0041527 A1* 2/2007 Tuchman et al. .......... 379/88.22
2010/0195642 A1* 8/2010 Terpstra et al. ............... 370/352

* cited by examiner

*Primary Examiner* — Yemane Mesfin
*Assistant Examiner* — Jeff Banthrongsack

(57) ABSTRACT

A method may include receiving a call placed to a local telephone number and identifying a toll free number associated with the local telephone number. The method may also include determining whether the toll free number is associated with a first call center for a customer using voice over Internet protocol (VoIP) trunking to route calls to the first call center, and identifying a dialed number identification service (DNIS) number associated with the toll free number. The method may further include forwarding the call and the DNIS number to the first call center via a VoIP trunking connection, in response to determining that the toll free number is associated with the first call center.

17 Claims, 8 Drawing Sheets

| DID 402 | TOLL FREE NUMBER 404 |
|---|---|
| 2105551234 | 8005551111 |
| 2105551235 | 8005553333 |
| 2105551238 | 8005555555 |
| 2102341111 | 8005552222 |
| ... | ... |

FIG. 4A

ROUTING CALLS WITHOUT TOLL FREE CHARGES

BACKGROUND INFORMATION

Companies often want to have local telephone numbers for their customers to use to contact them, as opposed to toll free telephone numbers. For example, companies often prefer that their customers contact them via local telephone numbers to avoid higher costs associated with toll free telephone numbers.

BRIEF DESCRIPTION OF THE DRAWINGS

FIGS. 4A and 4B illustrate exemplary tables used by one or more of the logic components illustrated in FIG. 3;

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to forwarding calls originally directed to local telephone numbers to a call center configured to receive calls directed to toll free telephone numbers. In one implementation, a network device may identify a toll free number associated with the local telephone number and determine whether the toll free number is associated with a call center customer that uses voice over Internet protocol (VoIP) trunking to route calls to the call center. If so, the network device may identify a dial number identification service (DNIS) number to include with the call and forward the call via the VoIP trunk to the call center. If the call center customer does not subscribe to VoIP trunking, the call may be routed to the call center with a DNIS number via the public network.

Figure 1:
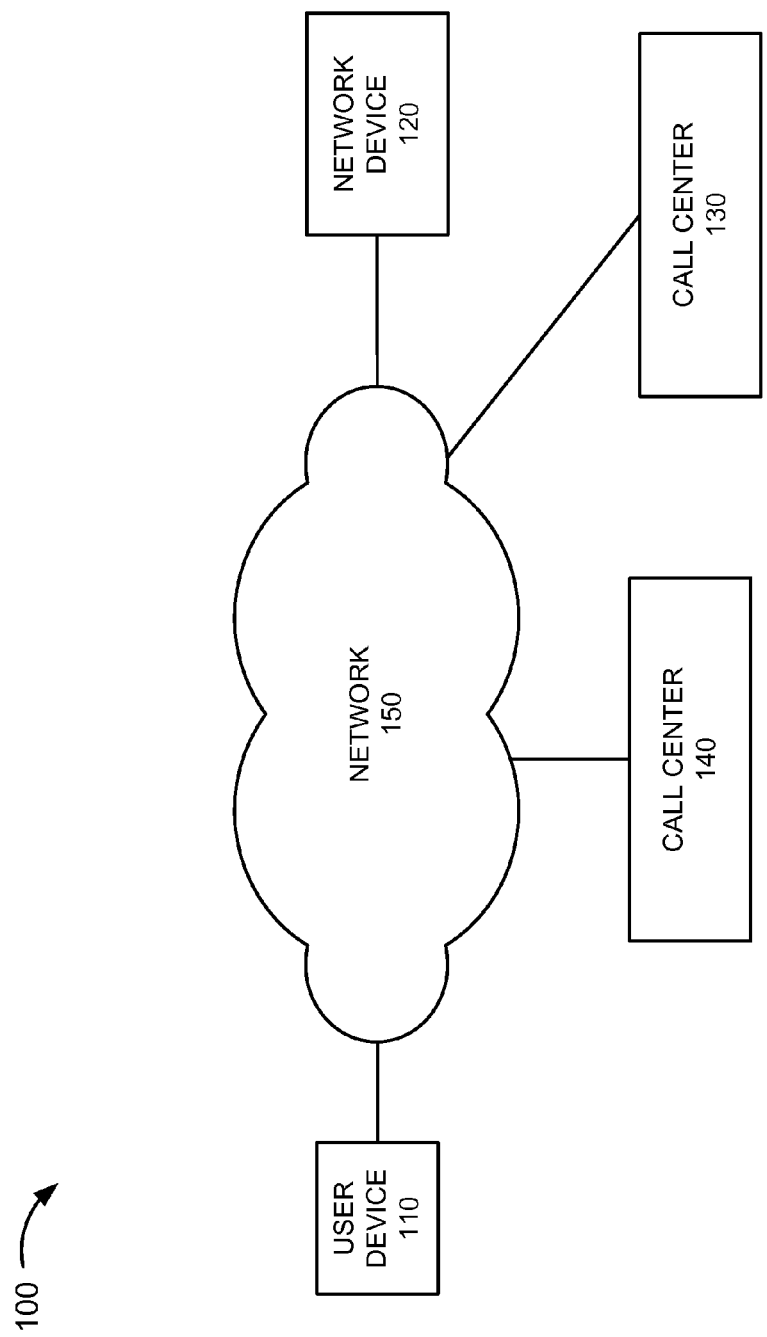
FIG. 1 illustrates an exemplary network in which systems and methods described herein may be implemented.

FIG. 1 is a block diagram of an exemplary network 100 in which systems and methods described herein may be implemented. Referring to FIG. 1, network 100 includes user device 110, network device 120, call centers 130 and 140 (also referred to herein as contact centers 130 and 140) and network 150.

User device 110 may include any type of communication or computation device that is capable of transmitting and receiving voice signals and/or data to/from a network, such as network 150. For example, user device 110 may include any standard telephone, cordless telephone, cellular telephone, a smart telephone, or other type of telephone that interfaces with a public switched telephone network (PSTN) and/or wireless network to place and receive telephone calls. User device 110 may also include any client, such as a computer device (e.g., a personal computer (PC), a laptop computer, a tablet computer, a personal digital assistant, etc.), a web-based appliance, etc., that is configured to provide telephone functions using, for example, voice over Internet protocol (VoIP), H.323 protocol, etc. For example, user device 110 may include a SIP-based telephone device. In this case, the SIP-based telephone device may take the form of a standalone device, e.g., a SIP telephone designed and configured to function and appear like a conventional telephone. A SIP-based telephone device may also include a software client that may run, for example, on a conventional personal computer (PC), laptop computer, or other computing device.

Network device 120 may include one or more devices that allow divergent transport networks to communicate and cooperatively carry traffic. For example, network device 120 may include a gateway that provides for interoperation at two levels, e.g., between different signaling schemes and between different media forms. As an example, network device 120 may adapt between SS7 signaling of network 150 and session initiation protocol (SIP), H.323 protocols or other protocols (e.g., Internet protocols (IPs) or Internet based protocols) used by other devices in network 100. In one implementation, network device 120 may convert time division multiplexed (TDM) encoded voice signals to a packetized data stream suitable for transport over a voice over Internet protocol (VoIP) trunk/network.

Network device 120 may also include one or more session border controllers (SBCs) that provide control of the boundary between different service provider networks, provide signaling protocol inter-working between an IP-based network and other service provider networks, control the transport boundary between service provider networks, and provide usage metering and Quality of Service (QoS) measurements for media flows. For example, network device 120 may receive a VoIP call from user device 110 and forward the VoIP call over a VoIP trunking network/path included in network 150.

Call center 130 may represent a call center configured to receive and handle a large volume of calls. Call center 130 may include a voice portal, an automatic call distributor (ACD), and agent workstations (WSs) (not shown). The voice portal may include an interactive voice response (IVR) unit that interacts with callers to obtain information associated with the call and direct the call to the appropriate agent or ACD (also not shown). In an exemplary implementation, call center 130 may be an "on-network" (also referred to as on-net) call center that is associated with a customer that subscribes to VoIP trunking with a service provider responsible for routing calls to call center 130.

Call center 140 may represent another call center designed to receive and handle calls. In an exemplary implementation, call center 140 may be an "off-network" (also referred to as off-net) call center that is accessible via a public network, such as the public switched telephone network (PSTN). That is, call center 140 may be associated with a customer that does not subscribe to VoIP trunking to forward calls to call center 140.

Network 150 may include one or more wired, wireless and/or optical networks that are capable of receiving and transmitting data and voice signals. For example, network 150 may include one or more private VoIP networks or VoIP trunks associated with particular customers. Network 150 may also include one or more PSTNs or other type of switched network. Network 150 may also include one or more wireless networks and may include a number of transmission towers for receiving wireless signals and forwarding the wireless signals toward the intended destination. Network 150 may further include one or more satellite networks, one or more packet switched networks, such as an Internet protocol (IP) based network, a local area network (LAN), a wide area network (WAN), an intranet, the Internet, or another type of network that is capable of transmitting telecommunications traffic (e.g., voice, video and/or data traffic). In an exemplary implementation, network 150 may include one or more SIP-based networks, one or more H.323/H.225-based networks, or any other type of packet switched network that is capable of transmitting traffic from a source device to a destination device. For example, network 150 may include an IP-based trunking network subscribed to by a customer associated with call center 130. In this case, calls directed to call center 130 may be transmitted to call center 130 via VoIP trunking connections.

The exemplary configuration illustrated in FIG. 1 is provided for simplicity. It should be understood that a typical network may include more or fewer devices than illustrated in FIG. 1. For example, one user device 110, one network device 120, two call centers 130 and 140 and one network 150 are shown for simplicity. It should be understood that network 100 may include a large number (e.g., hundreds or thousands) of user devices 110, a number of other networks devices similar to network device 120, additional call centers similar to call centers 130 and 140, and additional networks similar to network 150. Further, additional and/or different switching devices, routing devices, etc., involved in routing communications and data between user devices, such as user device 110, and call centers 130 and 140 may be included in network 100.

Further, various functions are described as being performed by particular components in network 100. In other implementations, various functions described as being performed by one device may be performed by another device or various functions described as being performed by multiple devices may be combined and performed by a single device.

Figure 2:
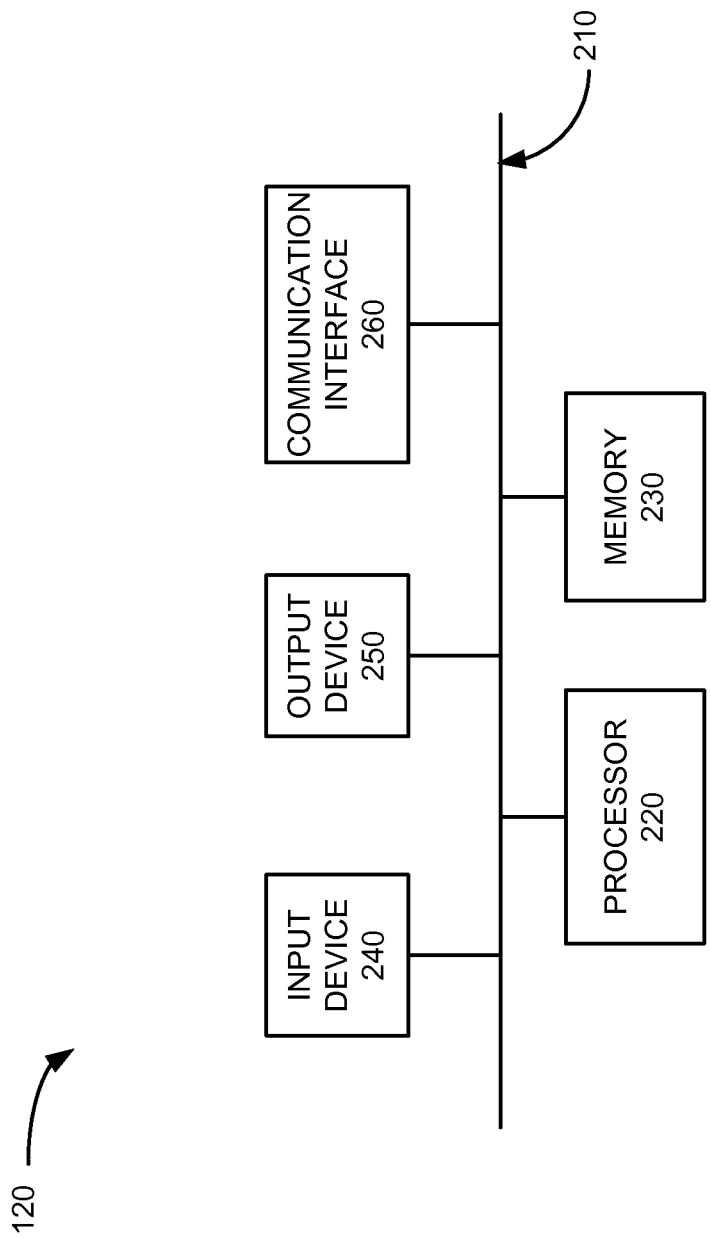
FIG. 2 illustrates an exemplary configuration of one or more of the components of FIG. 1.

FIG. 2 illustrates an exemplary configuration of network device 120. Other devices in network 100, such as user device 110 and call centers 130 and 140 may be configured in a similar manner. Referring to FIG. 2, network device 120 may include bus 210, processor 220, memory 230, input device 240, output device 250 and communication interface 260. Bus 210 may include a path that permits communication among the elements of network device 120.

Processor 220 may include one or more processors, microprocessors, or processing logic that may interpret and execute instructions. Memory 230 may include a random access memory (RAM) or another type of dynamic storage device that may store information and instructions for execution by processor 220. Memory 230 may also include a read only memory (ROM) device or another type of static storage device that may store static information and instructions for use by processor 220. Memory 230 may further include a solid state drive (SDD). Memory 230 may also include a magnetic and/or optical recording medium (e.g., a hard disk) and its corresponding drive.

Input device 240 may include a mechanism that permits a user to input information to network device 120, such as a keyboard, a keypad, a mouse, a pen, a microphone, a touch screen, voice recognition and/or biometric mechanisms, etc. Output device 250 may include a mechanism that outputs information to the user, including a display (e.g., a liquid crystal display (LCD), a printer, a speaker, etc.).

Communication interface 260 may include a transceiver that network device 120 may use to communicate with other devices (e.g., user device 110, call center 130, call center 140, devices in network 150, etc.) via wired, wireless or optical mechanisms. Communication interface 260 may also include one or more radio frequency (RF) transmitters, receivers and/or transceivers and one or more antennas for transmitting and receiving RF data via network 150. Communication interface 260 may also include a modem or an Ethernet interface to a LAN or other mechanisms for communicating with elements in a network, such as network 150 or another network.

The exemplary configuration illustrated in FIG. 2 is provided for simplicity. It should be understood that network device 120 may include more or fewer devices than illustrated in FIG. 2. In an exemplary implementation, network device 120 may perform operations in response to processor 220 executing sequences of instructions contained in a computer-readable medium, such as memory 230. A computer-readable medium may be defined as a physical or logical memory device. The software instructions may be read into memory 230 from another computer-readable medium (e.g., a hard disk drive (HDD), SSD, etc.), or from another device via communication interface 260. Alternatively, hard-wired circuitry may be used in place of or in combination with software instructions to implement processes consistent with the implementations described herein. Thus, implementations described herein are not limited to any specific combination of hardware circuitry and software.

Figure 3:
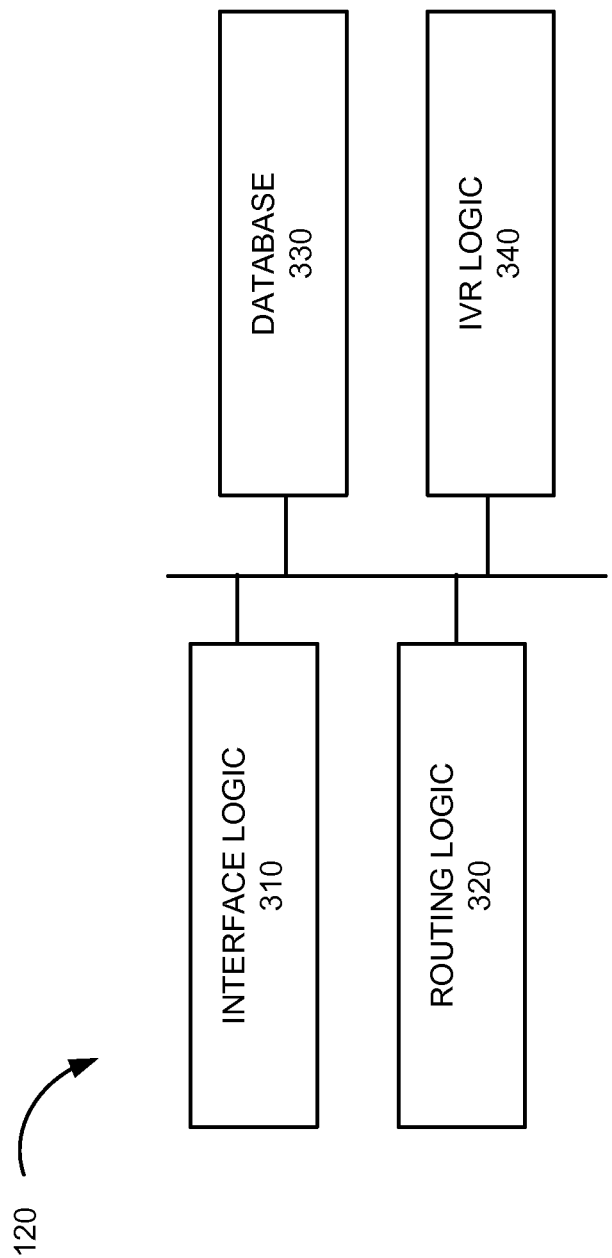
FIG. 3 illustrates an exemplary configuration of logic components implemented in one or more of the components of FIG. 1.

FIG. 3 is a functional block diagram of network device 120 according to an exemplary implementation. The logical blocks illustrated in FIG. 3 may be implemented in software, hardware, or a combination of hardware and software. For example, some or all of the logical blocks illustrated in FIG. 3 may be implemented by processor 220 executing instructions stored in memory 230. In one implementation, the logical blocks illustrated in FIG. 3 are implemented by network device 120. It should be understood that the logical blocks illustrated in FIG. 3 may be located externally with respect to network device 120 in other implementations, such as within another network device accessible via network 150.

Referring to FIG. 3, network device 120 may include interface logic 310, routing logic 320, database 330 and interactive voice response (IVR) logic 340. Interface logic 310 may include a front end that receives calls from callers (e.g., via user device 110). Interface logic 310 may determine the telephone number associated with an incoming call. For example, interface logic 310 may include an automatic number identification (ANI) system that determines the telephone number associated with an incoming call. In some implementations, interface logic 310 may also include logic to identify an address, such as an IP address, associated with an incoming call made from a computer device. Interface logic 310 may also identify the direct inward dialing (DID) number that was called/dialed by the caller.

Routing logic 320 may use the DID identified by interface logic 310 to determine whether the DID has a corresponding toll free number to which the call is to be forwarded. Routing logic 320 may also determine whether the toll free number has a corresponding inter-enterprise alias number (IEAN) that may be used to transfer the call to an "on-net" call center. Routing logic 320 may further determine a dialed number identification service (DNIS) number to be sent with the call, as described in detail below.

Database 330 may store information associated with forwarding calls to call centers. For example, database 330 may store a table of toll free numbers corresponding to local DID numbers. The table of toll free numbers corresponding to local telephone numbers may be used to allow a customer/company associated with a call center to receive "local" calls and avoid costs associated with toll free calls. Routing logic 320 may use the toll free number to identify a destination call center and the destination call center may use this information to determine how to route the call.

As an example, FIG. 4A illustrates an exemplary table 400 stored in, for example, database 330. Referring to FIG. 4A, table 400 may include DID field 402 and toll free number field 404. DID field 402 may store local telephone numbers assigned to entities/companies. The local telephone numbers may be advertised or provided by a company to their customers/users so that the customers/users can reach a call center (e.g., call center 130 or 140) associated with the entity/company.

Toll free number field 404 may include toll free numbers corresponding to the local DID numbers. For example, call centers 130 and 140 may be set up to identify particular companies associated with a call center based on the toll free number that was called/dialed. In situations where a company would like to provide local telephone numbers to allow customers to reach their call center, routing logic 320 may use the information in toll free number field 404 when forwarding a call to a call center.

Figure 4B:

Database 330 may also include another table to identify whether the dialed number and/or the identified toll free number includes an IEAN number and corresponding DNIS number that is to be forwarded to an on-net call center. For example, database 330 may include table 450 illustrated in FIG. 4B. Referring to FIG. 4B, table 450 may include IEAN field 452, DID field 454 and DNIS field 456. IEAN field 452 may store toll free numbers associated with customers. For example, the toll free numbers may be identified from table 400 based on the DID number. As described above, the toll free number may be used by call centers (e.g., call center 130) to identify the customer associated with the call, where to route the call, etc.

DID field 454, similar to DID field 402 in table 400, may store local telephone numbers assigned to entities/companies, such as a company associated with call center 130 or call center 140.

DNIS field 456 may include a DNIS number to be appended to a call when a call is to be forwarded to a call center. For example, a call center, such as call center 130 or call center 140, may use DNIS information to determine the entity/company associated with the cal, how to route the particular call, how to bill the entity/company for processing the call, etc.

Although tables 400 and 450 are shown in FIGS. 4A and 4B as separate tables, in other implementations, the information in tables 400 and 450 may be included in a single table.

Returning to FIG. 3, IVR logic 340 may include logic to transfer calls received by network device 120 to one of call centers 130 or 140. For example, IVR logic 340 may include an IVR application to generate a SIP refer message to transfer a call to the appropriate destination. IVR logic 340 may insert the DNIS associated with the destination call center to the SIP refer message to enable the destination call center to process the call in the same manner as if the caller dialed a toll free number. In some implementations, IVR logic 340 may also include speech recognition hardware/software that receives voice responses from the caller and identifies what the caller has voiced. For example, IVR logic 340 may interact with the caller to identify the reason for the call or the nature of the call. The exemplary configuration illustrated in FIG. 3 is provided for simplicity. It should be understood that network device 120 may include more or fewer devices than illustrated in FIG. 3.

Figure 5:
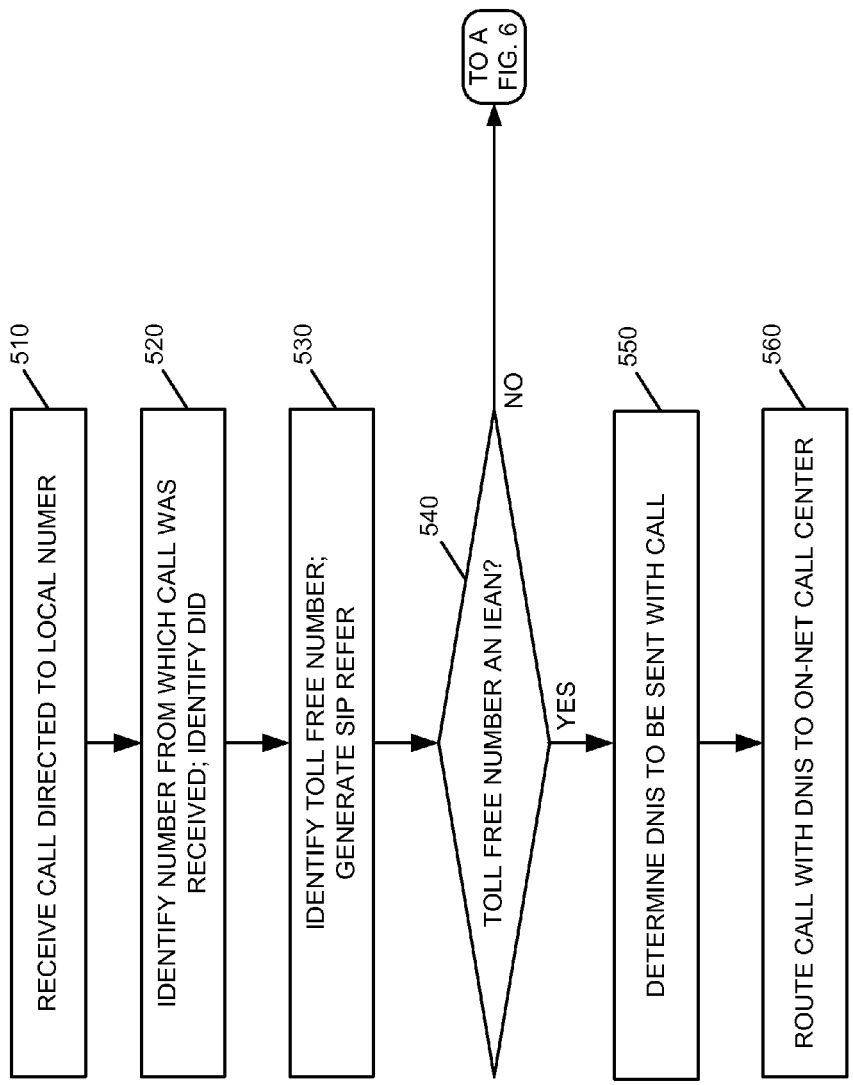
FIGS. 5 and 6 are flow diagrams illustrating exemplary processing associated with the components of FIG. 1.
Figure 6:
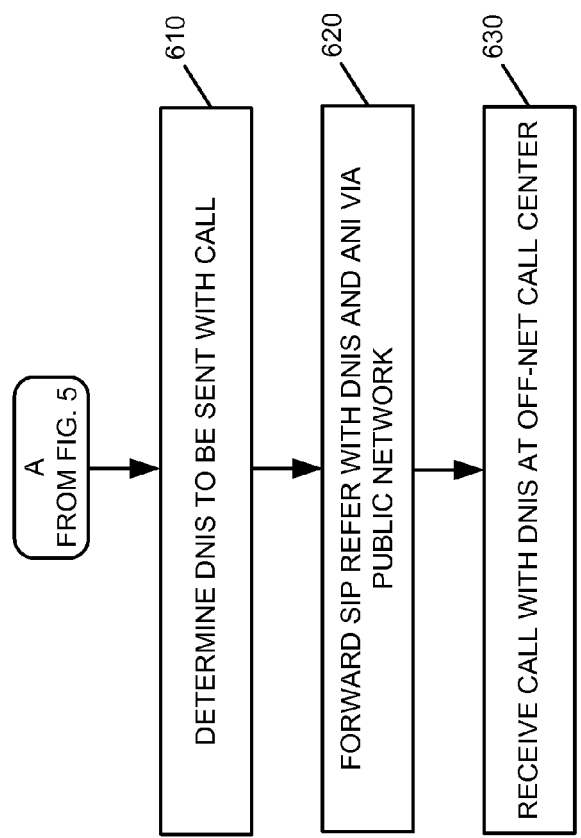
Figure 7:
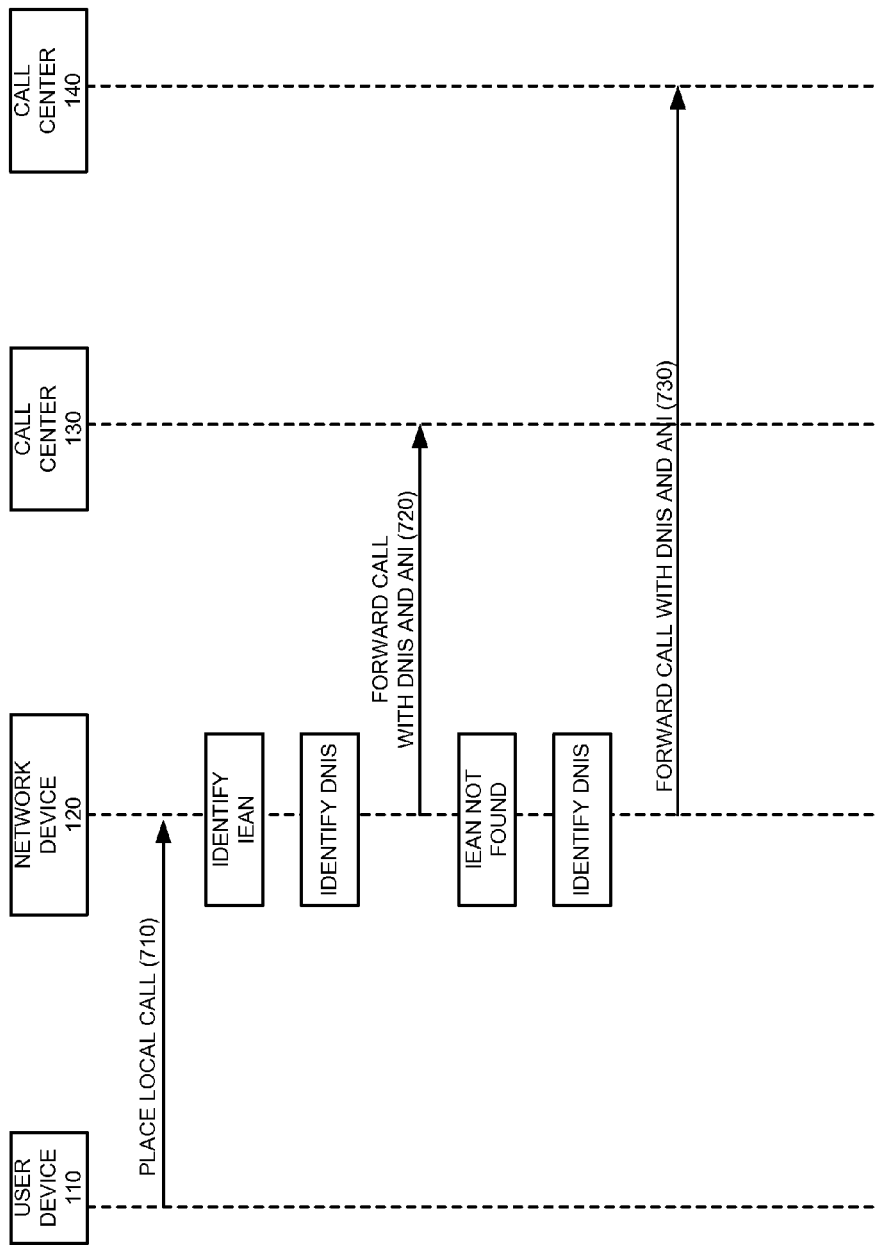
FIG. 7 is a signal flow diagram associated with the processing of FIGS. 5 and 6.

FIGS. 5 and 6 are exemplary flow diagram illustrating processing associated with forwarding calls in network 100 and FIG. 7 is an exemplary signal flow diagrams associated with the processing in FIGS. 5 and 6. The processing of FIGS. 5 and 6 will be described in connection with the signal flow diagram of FIG. 7. Processing may begin with a party at user device 110 placing a call to a local telephone number associated with a customer call center (FIG. 7, 710). For example, assume that a party at user device 110 places a call to telephone number 210-555-1234, which may be associated with one of call centers 130 or 140. The call may be transmitted from user device 110 via network 150. In an exemplary implementation, network device 120 may receive the call (FIG. 5, block 510).

Network device 120, as described above, may be a load balanced SBC that includes a host IVR application that receives calls and forwards the calls to the appropriate destinations and with the appropriate routing information. Interface logic 310 at network device 120 may identify the telephone number from which the call was placed (block 520). For example, interface logic 310 may perform an ANI lookup to identify the caller's telephone number. For example, assume that the call is placed from telephone number 210-888-8888. In this case, interface logic 310 may use ANI to identify the number 210-888-8888 as the caller's telephone number. Interface logic 310 may also identify the DID associated with the incoming call (block 520). That is, interface logic 310 may identify the telephone number dialed by the caller.

Routing logic 320 may receive the DID associated with the call and determine whether the DID has a corresponding toll free number (block 530). For example, routing logic 320 may access table 400 to identify a toll free number associated with the local telephone number to which the call was placed. Continuing with this example, routing logic 320 may identify that entry 410 includes the number 2105551234 in DID field 402. Routing logic 320 may identify the corresponding toll free number in field 404 of entry 410. In this example, routing logic 320 may identify the toll free number 800-555-1111. IVR logic 340 may generate a SIP refer message to transfer the call to the destination associated with the identified toll free number (block 530).

Routing logic 320 may also use the identified toll free number (or the DID) as an index to table 450 to determine whether the toll free number corresponds to an IEAN (block 540). For example, continuing with the example above in which the called local telephone number of 210-555-1234 corresponds to the toll free number 800-555-1111, routing logic 320 may determine whether the toll free number of 800-555-1111 is stored in IEAN field 452 of table 450.

If the toll free number is stored in IEAN field 452 of one of the entries in table 450 (block 540—yes), routing logic 320 may determine the DNIS number to be provided with the forwarded call (block 550). For example, routing logic 320 may identify the toll free number 800-555-1111 in field 452 of entry 470. Routing logic 320 may then identify that the DNIS in field 456 of entry 470 is 8005551111. This DNIS (i.e., 8005551111) may be forwarded with the call when the call is forwarded to an on-net call center, such as call center 130. For example, routing logic 320 and/or IVR logic 340 may forward the call, along with the DNIS of 8005551111 and ANI of 2108888888 to call center 130 via the SIP refer message (block 560; FIG. 7, 720). In addition, since the toll free number corresponds to an IEAN stored in table 450, routing logic 320 may forward the call via an IP trunking path within network 150 to call center 130.

In some implementations, call center 130 may receive the call and determine that the call should be handled at another call center, based on, for example, the DNIS and/or ANI. In this case, call center 130 may generate a SIP refer message and transfer the call to an appropriate call center via network 150.

Referring back to block 540, if routing logic 320 does not identify an IEAN corresponding to the toll free number in table 450 (block 540—no), routing logic 320 and/or IVR logic 340 may route the call to an off-net call center, such as call center 140. As an example, assume that the DID associated with the call is 210-234-1111. In this case, routing logic 320 may access table 400, identify the called number in field 402 of entry 440, and identify a corresponding toll free number of 800-555-2222 in field 404 of entry 440. Routing logic 320 may also use this toll free number as an index to table 450 to determine whether the toll free number is associated with an IEAN. Continuing with this example, assume that routing logic 320 determines that the toll free number of 800-555-2222 is not included in IEAN field 452 of any entry in table 450. This indicates that the call will be forwarded to an off-net call center, such as call center 140.

Routing logic 320 may determine a DNIS to be sent with the call (FIG. 6, block 610). In an exemplary implementation, routing logic 320 may use the toll free number as the DNIS. That is, routing logic 320 may identify the DNIS as being the same as the toll free number. Routing logic 320 and/or IVR logic 340 may forward the call via a SIP refer message, with the DNIS of 8005552222 and the ANI of 2108888888 to call center 140. In an exemplary implementation, IVR logic 340 may forward the call via a SIP refer message that includes the DNIS and ANI to call center 140 via a public portion of network 150 (e.g., the PSTN) (FIG. 7, 730). Call center 140 may then receive the call (block 630). Call center 140 may then process and/or route the call to an appropriate agent based on the DNIS and/or ANI.

In the manner described above, calls directed to local telephone numbers may be forwarded to on-net or off-net call centers without incurring toll free charges. For example, the service provider responsible for routing calls to call centers 130 and 140 may treat the calls as local calls. That is, a billing unit/system that may be included in network device 120 or located elsewhere in network 100, and that is associated with the service provider routing the calls to call centers 130 and 140 may treat the calls as local calls and bill the customer associated with call center 130 and/or 140 accordingly.

In the manner described above, call centers, such as call centers 130 and 140, may receive calls with DNIS information that allows the calls to be processed as if the calls were placed to a toll free number. For example, network device 120 may perform the necessary translation/processing to insert an appropriate DNIS number to the call that allows call centers 130 and 140 to process calls without requiring changes to the front ends/interfaces at call centers 130 and 140.

Implementations described herein provide for forwarding communications directed to local telephone numbers to a call center configured to receive communications directed to toll free telephone numbers. This may allow a customer/entity associated with the call center to avoid toll free charges associated with routing calls directed to toll free numbers. In addition, calls may be handled by the call center with minimal or no changes to the front end/infrastructure at the call center.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, features have been described above with respect to network device 120 performing processing associated with forwarding calls to call centers 130 and 140. In other implementations, another network device or multiple network devices may be involved in performing the tasks described above with respect to forwarding a call/communication. For example, in some implementations, multiple network devices 120 that include SBC functionality may be distributed within network 100. In this case, calls directed to call centers 130 and 140 may be forwarded in a load distributed manner to one of the network devices 120 and each of the load distributed network devices 120 may perform processing as described above with respect to FIGS. 5 and 6.

In addition, although the implementations have been described above with respect to receiving and forwarding telephone calls to a call center, in other implementations, other types of communications may be received and forwarded in a similar manner. For example, in other implementations, a contact center may receive video calls, video chats, electronic mail messages, text messages, instant messages or chats, facsimile messages, or any other type of communication. In each case, network device 120 or another network device may determine the appropriate destination and include the appropriate information, such as DNIS number, to forward with the communication.

In addition, while series of acts have been described with respect to FIGS. 5 and 6, and signal flows with respect to FIG. 7, the order of the acts and signal flows may be varied in other implementations. Moreover, non-dependent acts or signal flows may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessors, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
receiving, from a caller, a call placed to a local telephone number;
identifying a toll free number corresponding to the local telephone number;
determining whether the toll free number is associated with a first call center for a customer using voice over Internet protocol (VoIP) trunking to route calls to the first call center;
identifying a dialed number identification service (DNIS) number corresponding to the toll free number;

forwarding the call and the DNIS number to the first call center via a VoIP trunking connection, in response to determining that the toll free number is associated with the first call center for the customer using VoIP trunking to route calls to the first call center; and forwarding the call and the DNIS number to a second call center via a public network, in response to determining that the toll free number is not associated with a first call center for a customer using VoIP trunking to route calls to the first call center.

2. The method of claim 1, wherein the determining whether the toll free number is associated with a first call center for a customer using VoIP trunking to route calls to the first call center includes:

accessing a database to determine whether the toll free number has a corresponding alias.

3. The method of claim 2, wherein the identifying a DNIS number corresponding to the toll free number includes:

identifying the DNIS number corresponding to the alias in response to determining that the toll free number has a corresponding alias.

4. The method of claim 1, further comprising:

identifying a telephone number from which the caller placed the call, and wherein forwarding the call and the DNIS number to the first call center includes appending the telephone number from which the call was placed to the call.

5. The method of claim 1, wherein the forwarding the call and the DNIS number comprises:

generating a SIP refer message to forward the call to the first call center.

6. The method of claim 1, further comprising:

routing, at the first call center, the call based on the DNIS number forwarded with the call.

7. The method of claim 1, further comprising:

processing, by a service provider associated with the VoIP trunking connection, the call as a local call.

8. The method of claim 1, further comprising:

storing information in a database, wherein the database includes an alias number field, a direct inward dialing number field and a DNIS number field.

9. The method of claim 8, wherein the identifying a DNIS number includes:

accessing the database to determine whether the toll free number is stored in the alias number field, and identifying the DNIS number corresponding to the toll free number, in response to determining that the toll free number is stored in the alias number field.

10. A system, comprising:

at least one memory configured to store a database, the database including at least one of an alias number field, a direct inward dialing number field or a dialed number identification service (DNIS) number field; and logic configured to:
receive a call placed to a local telephone number,
access the database to identify a toll free number corresponding to the local telephone number,
access the database to identify a DNIS number corresponding to the toll free number,
forward the call and the DNIS number to a call center,
access the database to determine whether the toll free number is stored in the alias number field, and when identifying a DNIS number, the logic is configured to:
identify the DNIS number corresponding to the toll free number, in response to determining that the toll free number is stored in the alias number field.

11. The system of claim 10, wherein the logic is further configured to:

forward the call and the DNIS number to the call center via a VoIP trunking connection, in response to determining that the toll free number is stored in the alias number field.

12. The system of claim 10, wherein the logic is further configured to:

forward the call and the DNIS number to a second call center via a public network, in response to determining that the toll free number is not stored in the alias number field.

13. The system of claim 12, wherein when identifying a DNIS number, the logic is configured to identify the toll free number as the DNIS number, in response to determining that the toll free number is not stored in the alias number field.

14. The system of claim 10, wherein the logic is further configured to:

identify a telephone number from which the call was placed, and forward the telephone number from which the call was placed with the forwarded call.

15. The system of claim 10, wherein when forwarding the call, the logic is configured to:

generate a SIP refer message to forward the call to the call center.

16. The system of claim 10, further comprising:

a billing unit configured to charge a customer, associated with the call center, for routing the call to the call center an amount associated with a local telephone call.

17. A non-transitory computer-readable medium having stored thereon sequences of instructions which, when executed by at least one processor, cause the at least one processor to:

receive a communication placed to a local telephone number;

identify a toll free number corresponding to the local telephone number;

determine whether the toll free number is associated with a first contact center for a customer using voice over Internet protocol (VoIP) trunking to route calls to the first contact center;

identify a dialed number identification service (DNIS) number corresponding to the toll free number;

forward the communication and the DNIS number to the first contact center via a VoIP trunking connection, in response to determining that the toll free number is associated with the first contact center; and forward the communication and the DNIS number to a second contact center via a public network, in response to determining that the toll free number is not associated with the first contact center.

* * * * *